US008085913B2

(12) United States Patent
Wilkes

(10) Patent No.: US 8,085,913 B2
(45) Date of Patent: Dec. 27, 2011

(54) MOBILE TELEPHONE SERVICES PROVIDED USING PRE-PAID FINANCIAL ACCOUNTS

(75) Inventor: T. Clay Wilkes, North Salt Lake, UT (US)

(73) Assignee: Galileo Processing, Inc., Salt Lake City, UT (US)

( * ) Notice: Subject to any disclaimer, the term of this patent is extended or adjusted under 35 U.S.C. 154(b) by 1320 days.

(21) Appl. No.: 11/466,069

(22) Filed: Aug. 21, 2006

(65) Prior Publication Data

US 2007/0043664 A1    Feb. 22, 2007

Related U.S. Application Data

(60) Provisional application No. 60/709,637, filed on Aug. 19, 2005.

(51) Int. Cl.
*H04M 15/00* (2006.01)
*H04M 11/00* (2006.01)
*G06Q 40/00* (2006.01)

(52) U.S. Cl. ............... 379/114.2; 379/114.17; 455/406; 705/39

(58) Field of Classification Search .. 379/114.15–114.18, 114.2; 455/405–408; 705/53, 75, 39, 40
See application file for complete search history.

(56) References Cited

U.S. PATENT DOCUMENTS

| | | | |
|---|---|---|---|
| 6,473,500 B1 * | 10/2002 | Risafi et al. | 379/144.01 |
| 2002/0174016 A1 * | 11/2002 | Cuervo | 705/16 |
| 2003/0043984 A1 * | 3/2003 | Lauzon | 379/144.01 |
| 2004/0141601 A1 * | 7/2004 | Cai et al. | 379/114.2 |
| 2006/0078099 A1 * | 4/2006 | Liebenow et al. | 379/114.2 |

OTHER PUBLICATIONS

Financial Account Systems With Multiple Users and Access Methods; U.S. Appl. No. 11/137,993, filed May 25, 2005; Inventors: T. Clay Wilkes and Matthew R. Bentley.

* cited by examiner

*Primary Examiner* — Quoc D Tran
(74) *Attorney, Agent, or Firm* — Maschoff Gilmore & Israelsen

(57) ABSTRACT

A method and system for providing telephone services. An exemplary system includes a financial account having at least one balance. Funds can be added to the balance of the account using a variety of deposit mechanisms. Similarly, the funds located in the account may be accessed using a variety of financial mechanisms, including a debit card, check, and the like. In addition, the funds located in the account may be accessed with a telephone, where transactions performed by the telephone, such as telephone calls, Internet access, and the like, are directly funded by the financial account.

11 Claims, 4 Drawing Sheets

MOBILE TELEPHONE SERVICES PROVIDED USING PRE-PAID FINANCIAL ACCOUNTS

CROSS-REFERENCE TO RELATED APPLICATIONS

This application claims the benefit of U.S. Provisional Application No. 60/709,637, filed Aug. 19, 2005, which is incorporated herein by reference in its entirety.

BACKGROUND OF THE INVENTION

1. The Field of the Invention

The present invention relates to systems and methods for creating and managing financial accounts. More particularly, embodiments of the present invention relate to systems for using a prepaid financial account to pay for mobile services.

2. The Relevant Technology

Mobile telephone services are currently available to consumers in both pre-paid and post-paid modes. To receive post-paid mobile telephone services, consumers typically enter into an agreement with a wireless telephone services provider. Under a typical agreement with a wireless telephone services provider, a consumer pays a monthly fee in exchange for the ability to use a predetermined number of wireless telephone minutes and/or services on the network of the wireless telephone services provider. In the event that the consumer exceeds the predetermined number of minutes and/or services, penalty or per-minute charges are assessed and billed to the account of the consumer. Each month the consumer pays any penalty or per-minute fees that might have been incurred as well as the regular monthly fee.

While under a post-paid mobile telephone services agreement, consumers receive and pay monthly bills based on the number of minutes and/or services used for a certain month, under a pre-paid mobile telephone service agreement, consumers pre-pay an amount to load a mobile telephone with minutes and/or services. When the amount is depleted, the mobile telephone ceases to function until the pre-aid account receives funds and the minutes and/or services of the telephone are reloaded. Examples of pre-paid mobile telephone services include POSA (Point of Sale Activation) and PIN delivery systems.

Although consumers can select either post-paid or pre-paid mobile services, consumer flexibility with regard to choice of mobile service providers and payment of mobile services is limited. Both post-paid and pre-paid mobile telephone services are available to consumers primarily through mobile telephone service providers offering mobile telephone services exclusively. In particular, consumers have limited flexibility with regard to systems and methods for paying for and using minutes and/or services on mobile telephones.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of providing telephone services. The method may be practiced, for example, in a computer system containing financial account information. The method includes associating a financial account with at least one telephone number. The financial account is configured to manage financial transactions in addition to those related to the telephone number associated with the financial account. The method also includes receiving a notification of the occurrence of a telephone transaction related to the at least one telephone number. An amount is then deducted from an account balance of the financial account reflecting at least a portion of the value of the telephone transaction Another embodiment described in more detail herein includes a system for providing telephone services. The system includes a financial account having at least one balance. The funds can be added to one or more balances of the financial account by a deposit component. The system also includes a debit component for accessing the at least one balance of the financial account with a telephone, where the telephone transactions associated with the usage of the telephone are funded by the at least one balance of the financial account. The account balance may also be accessed by at least one other financial vehicle in addition to the telephone, such as, for example, a debit card.

A further embodiment is directed to a method of providing telephone services. The method includes identifying a financial account having an account balance and being configured for managing financial transactions that are unrelated to telephone transactions. The financial account is associated with at least one telephone number. A debit component is linked to the telephone number associated with the financial account, such that when a telephone transaction is performed that relates to the at least one telephone number, an appropriate amount is debited from the account balance of the financial account.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to systems and methods for using a financial account to access and pay for telephone services. A telephone is linked to a financial account such that usage fees incurred by the use of minutes, services, and/or other telephone transactions associated with the telephone are automatically deducted from a balance of the account. Thus, the financial account provider offers both financial account services and telephone services associated with the financial account. Although the present invention may be applied to both traditional wireline telephones and to mobile telephones, the disclosure will primarily explain the invention's application to mobile telephones.

Figure 1:
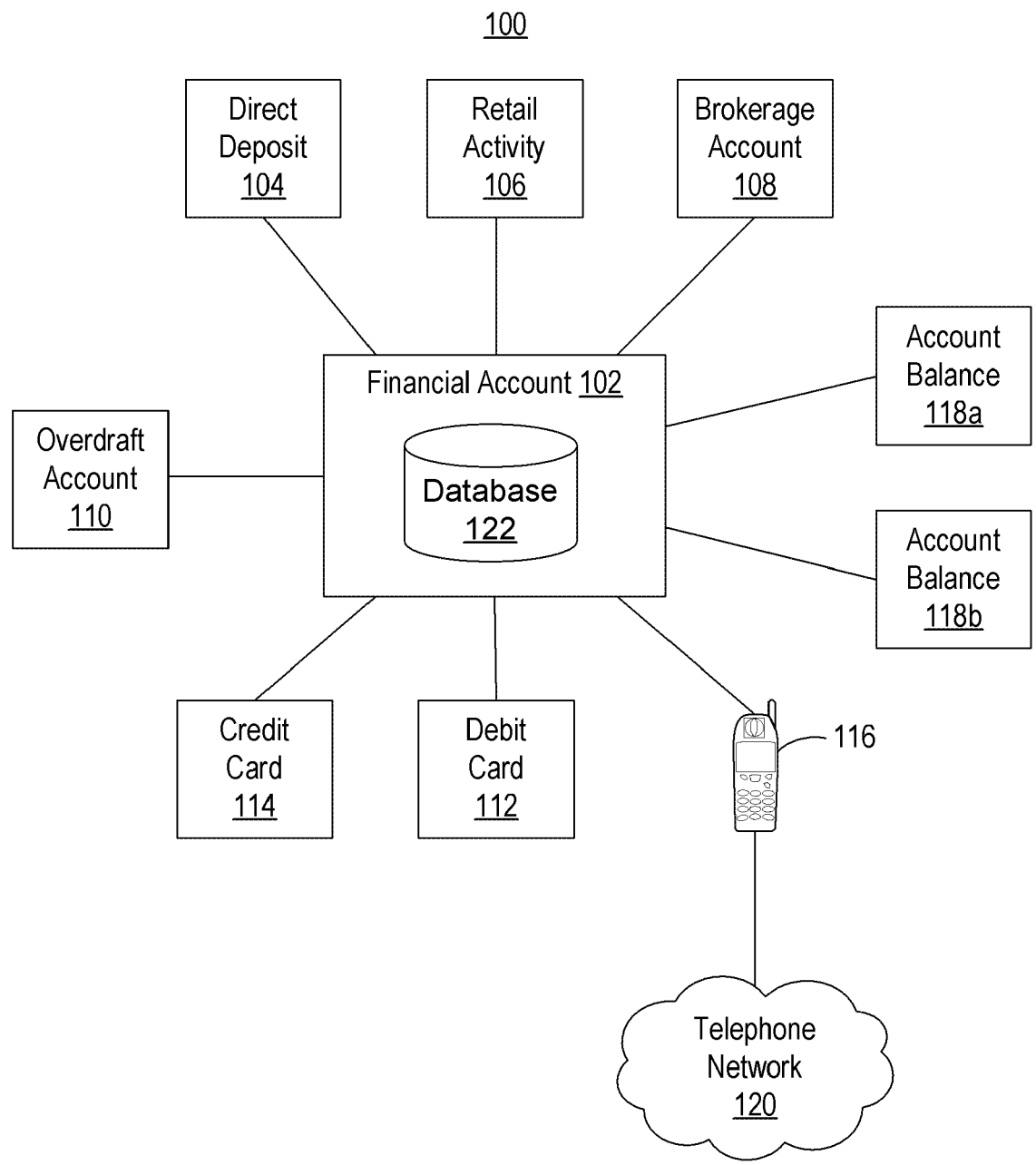
FIG. 1 illustrates a schematic of a financial account linked to various deposit and debit mechanisms, including a telephone, in accordance with the present invention.

In one embodiment of the invention, the financial account is maintained in a system in which any number of different balances of the account can be added to by any number of different techniques. FIG. 1 illustrates aspects of such a system 100 and the associated mobile telephone device 116 and network 120. For example, funds may be added to the balance of the financial account 102 of FIG. 1 by direct deposit of payroll funds 104, or by Internet or retail transactions 106. In addition, the financial account 102 may be linked to other accounts such as a brokerage account 108, for example. Further, the financial account 102 may include a line of credit with a financial institution. The line of credit may be linked to the account as an overdraft account 110. The data that defines the accounts using the techniques disclosed herein may be stored in a database 122 or another data structure and allow the financial institution to control and manage account activity in ways that are compatible with the account definition.

In addition to maintaining any number of different balances, the financial account 102 can be accessed by any number of different methods including debit cards 112 or credit cards 114, for example. In general, the financial account 102 may further operate in a similar manner as a traditional checking account, savings account, money market account, and the like. Therefore, the financial account 102 allows the user to easily deposit and withdraw funds using a variety of deposit and debiting mechanisms.

The financial account 102 may be associated with one or more account balances 118a and 118b, each of which may be used for general purpose expenses or alternatively may be dedicated to specific types of expenses. The funds located within the account balances 118a and 118b may be accessed via a variety of financial mechanisms, including but not limited to those described above.

In accordance with the present invention, a telephone 116, such as a mobile telephone, is linked to the financial account 102 much like a debit card 112 or credit card 114 may be linked to the account, in that use of the mobile telephone automatically deducts funds from the account according to the type of telephone transaction used on the telephone. The telephone transaction may include a telephone call, wherein the value of the transaction may be based on the number of minutes used, the time and date that the telephone call was made, the location of the caller and the receiver of the telephone call, the identities of the caller and the receiver of the telephone call, the types of calling plans participated in by the caller and the receiver of the telephone call, and the like. The telephone transaction may also include a variety of other services that are available through a telephone service plan, such as Internet usage, Short Messaging Service (i.e., SMS or text messaging), Multimedia Messaging Service (MMS), data downloads (e.g., ringtones, photos, videos, video games, and the like), Email services, voice messaging services, and the like.

When a telephone transaction is performed by the telephone 116, an appropriate amount that is attributable to the user of the telephone 116 may be deducted from one or more of the account balances 118a and 118b in order to pay for the services used. As described above, the funds located in the account balances 118a and 118b may be established for a variety of purpose, including payment of a specific type of expense. In one embodiment, one or more of the account balances 118a and 118b may be dedicated for the payment for the telephone transactions performed by the telephone 116, as described above. By dedicating an account balance 118a or 118b to the payment of telephone services, funds are not being drawn directly from the user's primary account balance, such as a checking or savings account balance, in order to pay for the telephone service. A user may opt to directly deposit a predefined amount into account balance 118a or 118b dedicated to the payment of telephone services each month in order to limit the amount of money that may be used for telephone services. Multiple account balances may be established, where each account balance is associated with a unique telephone or user, such as multiple family members. Further, a balance of the financial account 102 designated to be used for mobile telephone fees may also be linked to an overdraft balance 110 of the financial account, thereby enabling a user of the mobile telephone 116 to have increased flexibility in usage of the mobile telephone.

In one embodiment, one or more of the account balances 118a and 118b may include a pre-paid account balance. The pre-paid accounts used according to the invention to provide mobile telephone services can be simpler and may include only a single balance and method of adding funds to the account. U.S. patent application Ser. No. 11/137,993, filed May 25, 2005, describes examples of accounts that can be adapted for use according to the invention, and is incorporated herein by reference.

Figure 2:
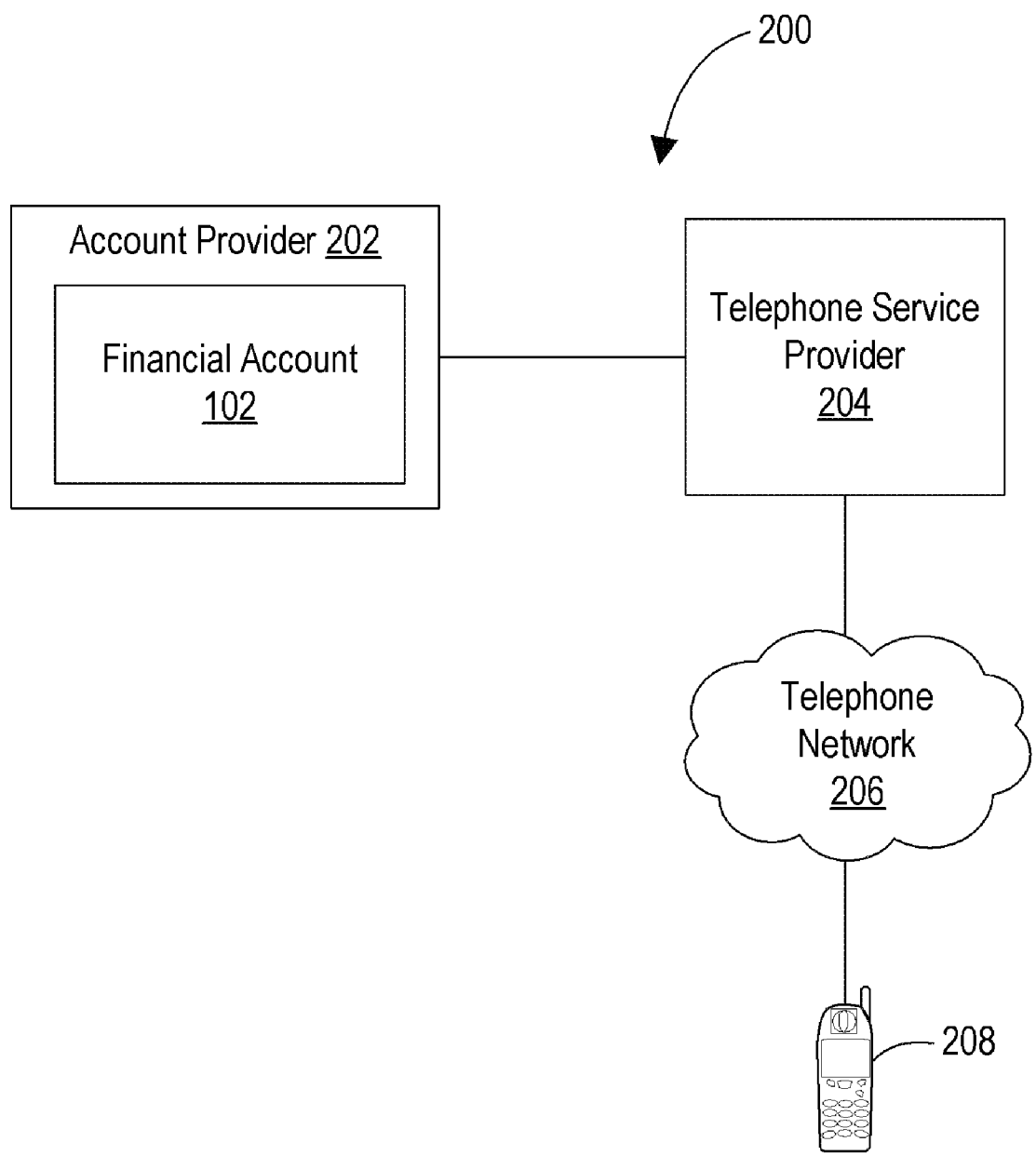
FIG. 2 illustrates a schematic of the relationship between an account provider and a telephone service provider, in accordance with the present invention.

FIG. 2 is provided to illustrate a system 200 including an account provider 202 having a relationship with a telephone service provider 204. The account provider 202 may include, for example, a financial institution such as a bank, a credit union, and the like. In one embodiment, the financial account provider 202 may coordinate with a telephone service provider 204, such as the provider of a mobile telephone network, in order to secure usage access to a telephone network 206, which may include a mobile telephone network.

In one embodiment of the invention, a client having a financial account 102 with the account provider 202 initiates a telephone transaction, such as a telephone call, from a mobile telephone 208 associated with the financial account 102 and linked to the telephone network 206. In one embodiment, the telephone service provider 204 requests authorization from the account provider 202 prior to performing the telephone transaction. Upon receiving the authorization request from the telephone service provider 204, the telephone service provider 204 checks the financial account 102 to determine if the account contains sufficient funds to pay for the telephone transaction. If the financial account 102 contains sufficient funds, then the account provider 202 authorizes the telephone transaction.

The transaction is then performed by the telephone service provider 204, and the appropriate amount that is attributable to the financial account 102 is then debited from one or more of the account balances 118a, 118b, and/or 110. For example, after authorizing the mobile telephone 208 to participate in a phone call, the account provider 202 may deduct a fee from a balance of the associated financial account 102 that reflects the number of minutes used by the mobile telephone 208. For example, the amount deducted from the account balance may be determined by multiplying the number of minutes used by a predetermined rate. The deduction of fees may occur in real time, i.e, during and/or after each telephone transaction.

In one embodiment, if the account provider 202 determines that insufficient funds are contained within the financial account 102, a message may be provided to the user of the telephone 208 notifying the user of the status of the account and if the inability to perform the requested telephone transaction. For example, if the balance of the user's account falls below a predetermined value, a warning message may be provided to the user to inform the user that the call to be terminated in a stated amount of time due to lack of funds. The warning message may be audible or visual.

The system 200 may operate under a Signaling System 7 ("SS7") telecommunications protocol which is used for exchanging information used to set up calls and to control the network, including call control, database and billing management, maintenance functions associated with the mobile telephone use, and the like.

The account provider 202 and/or the telephone service provider 204 may maintain Call Detail Records ("CDRs") concerning calls made to and from the mobile telephone 208. The information regarding the CDRs may be updated through an Application Programming Interface ("API").

As illustrated in FIG. 2, in one embodiment of the invention, the financial account provider 202 partners with a mobile telephone service provider 204 in order to integrate mobile telephone services into the financial account 102. The partnership between the financial account provider 202 and the mobile telephone service provider 204 allows the account provider to secure usage access to the mobile telephone service provider's mobile telephone network 206. By partnering with the mobile telephone network provider in this way, the financial account provider 202 is able to operate as a Mobile Virtual Network Operator ("MVNO") allowing clients to access a mobile telephone network 206 without requiring the clients to interact directly with the mobile telephone network provider 204. Moreover, the financial account provider 202 can brand the telephone services and mobile telephone hardware as desired.

Linking the financial account 102 to a telephone 116 as described above may provide useful benefits for users of the system 200, for the account provider 202, and for the telephone service provider 204. For example, the user of the financial account 102 benefits from the convenience of being able to enjoy the advantages of a normal phone service without being required to open a separate telephone account. Furthermore, the user of the account is no longer required to pay a separate phone bill, or even establish an automatic payment of a separate phone bill, because the payment for telephone services used is automatically deducted from a balance of the user's financial account 102. Clients of the financial account provider 202 are thus able to receive mobile telephone services in conjunction with the diverse financial account services already inherent in the financial account 102.

The account provider 202 also benefits by having an additional service that may be offered to customers, as well as the benefit of retaining the customer's funds used to pay for the telephone service. The mobile telephone network provider benefits from this relationship as well, since the financial account provider, acting as an MVNO, purchases minutes and/or services from the mobile telephone network provider, which results in higher levels of utilization of the mobile telephone network 206.

Although one embodiment of the invention includes a financial account provider that operates as an MVNO and provides mobile telephone services linked to a financial account operated within its financial system, the identity of the parties that perform various roles in the system can vary, as will be appreciated by one of ordinary skill the art. For instance, the entity that offers mobile telephone services can be different from the financial account provider, in which case, the mobile telephone service provider would interface and communicate with the financial network of the financial account provider. Alternatively, some or all of the functions performed by the financial account provider in the examples presented herein can be instead performed by the mobile telephone network provider.

Figure 3:
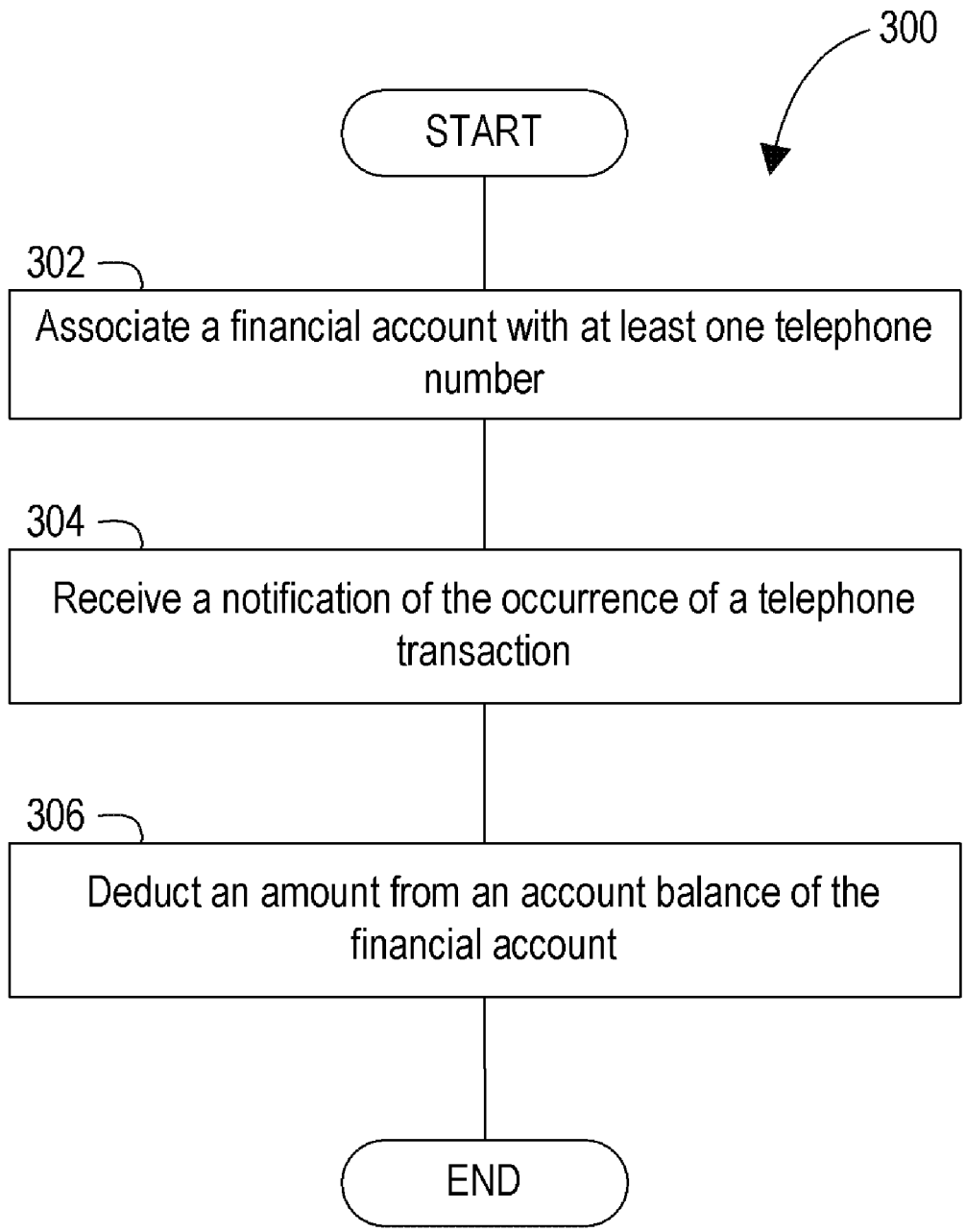
FIGS. 3 and 4 illustrate flow diagrams of methods for providing telephone services, in accordance with the present invention.

FIG. 3 illustrates one embodiment of a method 300 of providing telephone services. The method 300 may be practiced, for example, in a computer system containing financial account information. The service associates 302 a financial account with at least one telephone number. As described previously, the financial account is configured to manage other financial transactions in addition to transactions related to the telephone numbers linked to the financial account. In one embodiment, the telephone number identifies a mobile wireless telephone number.

When a telephone associated with one of the telephone numbers participates in a telephone transaction, such as a phone call or data download, the service receives 304 a notification of the occurrence of the telephone transaction. The notification may be received on a per-telephone transaction basis, including continuous updates during the telephone transaction.

The service then deducts 306 an amount from an account balance of the financial account reflecting at least a portion of the value of the telephone transaction. As described previously, certain funds within the financial account may be dedicated to the payment of telephone transactions related to telephone numbers associated with the financial account. When the funds dedicated to telephone transactions are depleted, additional telephone transactions will not be authorized by the service.

In one embodiment, prior to the completion of the telephone transaction, the service receives an authorization request from a third party telephone service provider to perform the telephone transaction. Upon receiving the authorization request, the service verifies that the financial account contains sufficient funds to perform the telephone transaction. If the account is found to have sufficient funds, the service authorizes the telephone transaction.

Figure 4:
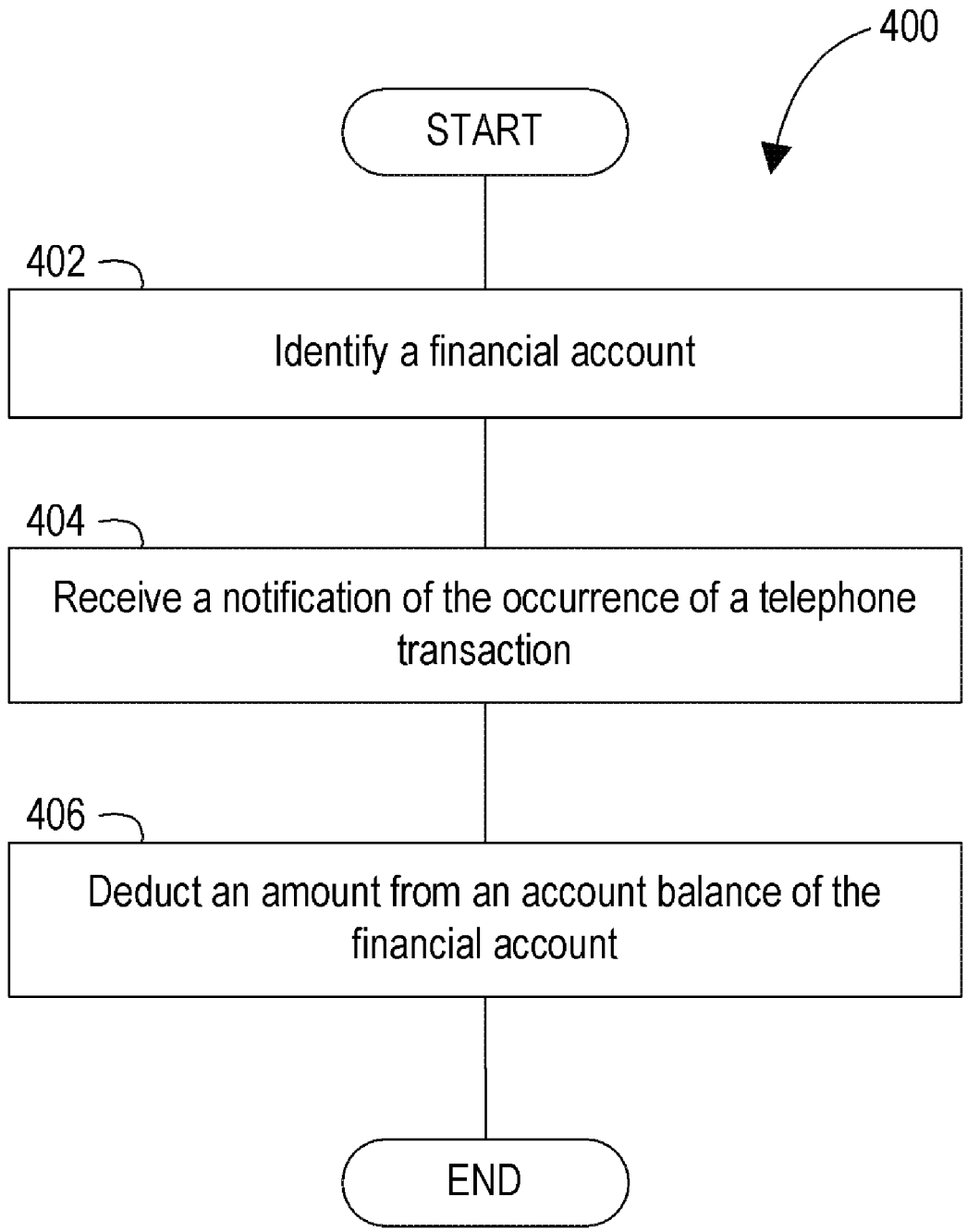

Referring now to FIG. 4, a method 400 is illustrated of providing telephone services. The method 400 may be practiced, for example, in a computer system containing financial account information. The method 400 identifies 402 a financial account having an account balance. As described previously, the financial account is configured for managing financial transactions that are unrelated to telephone transactions.

The method 400 then associates 404 the financial account with at least one telephone number, which may identify, for example, a mobile wireless telephone. The method 400 links 406 a debit component of the financial account to the telephone numbers associated with the financial account. The debit component and the telephone numbers are linked such that when a telephone transaction is performed that relates to the telephone number, an appropriate amount is debited from the account balance of the financial account.

Embodiments of the invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium capable of storing instructions or data structures and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. The computer-executable instructions and associated data structures represent an example of program code means for executing the steps of the invention disclosed herein.

The invention further extends to computer systems adapted for use with methods for tracking financial accounts and the usage of mobile telephone devices and for otherwise maintaining financial transaction data as described herein. Those skilled in the art will understand that the invention may be practiced in computing environments with many types of computer system configurations, including personal computers, multi-processor systems, network PCs, minicomputers, mainframe computers, and the like. The invention will be described herein in reference to a distributed computing environment, such as the Internet, where tasks are performed by remote processing devices that are linked through a communications network. In the distributed computing environment, computer-executable instructions and program modules for performing the features of the invention may be located in both local and remote memory storage devices.

The present invention may be embodied in other specific forms without departing from its spirit or essential characteristics. The described embodiments are to be considered in all respects only as illustrative and not restrictive. The following claims are presented to illustrate various novel features of the present invention. The claims are not exhaustive of the embodiments of the invention, nor are they to be construed as limiting the scope of the invention. Moreover, the invention disclosed in detail herein can be defined with other claims, including those that will be included in any related non-provisional applications that will be filed during the pendency of this provisional application.

What is claimed is:

1. In a computer system containing financial account information, a method for providing telephone services, the method comprising:
  associating a financial account with a telephone number of a mobile wireless telephone, the financial account configured for managing financial transactions in addition to transactions related to the telephone number; the financial account including:
    a first prepaid account balance; and
    an overdraft balance linked to the first prepaid account balance;
  receiving a notification of the occurrence of a telephone transaction related to the telephone number of the mobile wireless telephone, the telephone transaction having a value; and
  in response to receiving the notification of the occurrence of the telephone transaction related to the telephone number of the mobile wireless telephone:
    decreasing the first prepaid account balance by a first portion of the value of the telephone transaction; and
    increasing the overdraft balance by the remaining portion of the value of the telephone transaction.

2. The method as recited in claim 1, further comprising:
  receiving an authorization request to perform the telephone transaction;
  verifying that the financial account contains sufficient funds to perform the telephone transaction; and
  authorizing the telephone transaction.

3. The method as recited in claim 2, wherein the telephone transaction employs a telephone network provided by a third party telephone service provider.

4. The method as recited in claim 3, wherein the authorization request is received from the third party telephone service provider.

5. The method as recited in claim 1, wherein the telephone transaction is a phone call;
  wherein decreasing the first prepaid account balance by a first portion of the value of the telephone transaction includes:
    decreasing the first prepaid account balance by a first portion of the value of the phone call; and
  wherein increasing the overdraft balance by the remaining portion of the value of the telephone transaction comprises:
    increasing the overdraft balance by the remaining portion of the value of the phone call.

6. The method as recited in claim 1, wherein the telephone transaction is a data download;
  wherein decreasing the first prepaid account balance by a first portion of the value of the telephone transaction includes:
    decreasing the first prepaid account balance by a first portion of the value of the data download; and
  wherein increasing the overdraft balance by the remaining portion of the value of the telephone transaction comprises:
    increasing the overdraft balance by the remaining portion of the value of the data download.

7. In a computer system containing financial account information, a method for providing telephone services, the method comprising:
  identifying a financial account configured for managing financial transactions that are unrelated to telephone transactions, the financial account including:
    a first prepaid account balance; and
    an overdraft balance linked to the first prepaid account balance;
  associating the financial account with a telephone number; and
  linking a debit component of the financial account to the telephone number, such that when a telephone transaction that relates to the telephone number occurs, an appropriate amount is obtained from the first prepaid account balance and the overdraft balance collectively.

8. The method as recited in claim 7, further comprising:
  receiving an authorization request to perform the telephone transaction;
  verifying that the financial account contains sufficient funds to perform the telephone transaction; and
  authorizing the telephone transaction.

9. The method as recited in claim 8, wherein the telephone transaction employs a telephone network provided by a third party telephone service provider.

10. The method as recited in claim 9, wherein the authorization request is received from the third party telephone service provider.

11. The method as recited in claim 7, wherein the telephone number identifies a mobile wireless telephone number.

* * * * *